United States Patent [19]
Miura et al.

[11] Patent Number: 4,466,026
[45] Date of Patent: Aug. 14, 1984

[54] RECORD/REPRODUCE CIRCUIT FOR VTR

[75] Inventors: Kuniaki Miura, Ibaraki; Akira Shibata, Katsuta; Noboru Kojima; Keiichi Komatsu, both of Yokohama; Teizo Tamura, Katsuta; Makoto Konosu, Katsuta; Yasuji Moriyama, Katsuta, all of Japan

[73] Assignee: Hitachi, Ltd., Tokyo, Japan

[21] Appl. No.: 349,519

[22] Filed: Feb. 17, 1982

[30] Foreign Application Priority Data

Feb. 23, 1981 [JP] Japan ................... 56-24293

[51] Int. Cl.³ .................... G11B 5/02; H04N 5/782
[52] U.S. Cl. .................... 360/61; 360/10.3; 360/63; 360/67
[58] Field of Search .................... 360/10.1, 10.3, 55, 360/61, 63, 67; 358/312

[56] References Cited

U.S. PATENT DOCUMENTS

3,838,451  9/1974  Mino .................... 360/10.3 X

FOREIGN PATENT DOCUMENTS

117485  9/1981  Japan .
  2177  1/1982  Japan .
 36677  3/1982  Japan .

*Primary Examiner*—Robert L. Richardson
*Attorney, Agent, or Firm*—Antonelli, Terry & Wands

[57] ABSTRACT

A record/reproduce circuit for VTR comprising two normal reproducing heads with different azimuth angles, a special reproducing head with the same azimuth angle as that of the one normal reproducing head, a rotary transformer through which signals from these heads are supplied to a static circuit section, a change-over means for alternately switching a signal from the special reproducing head and a signal from the other normal reproducing head with a different azimuth angle from that of the special reproducing head, a feedback type preamplifier for amplifying the output of the change-over means, and another feedback-type preamplifier for amplifying a signal from the normal reproducing head with the same azimuth angle as that of the special reproducing head.

11 Claims, 6 Drawing Figures

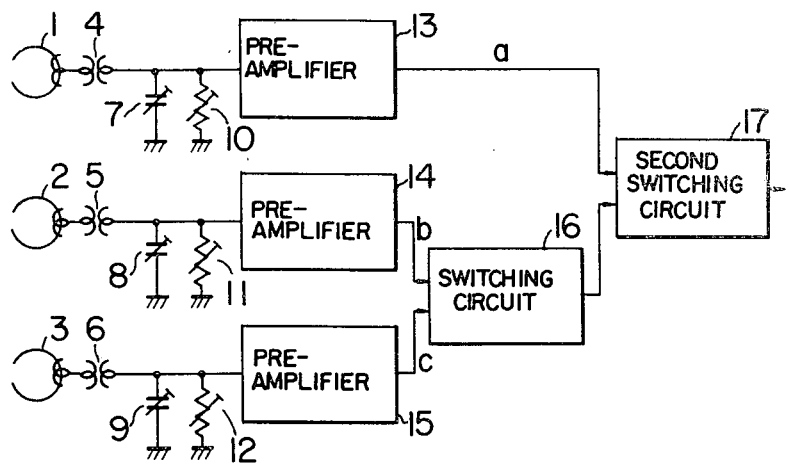
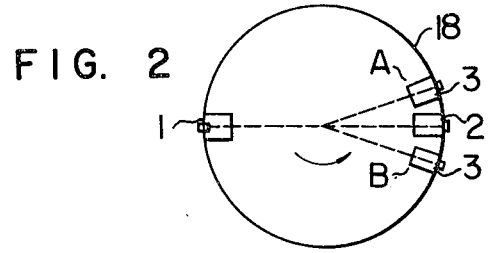
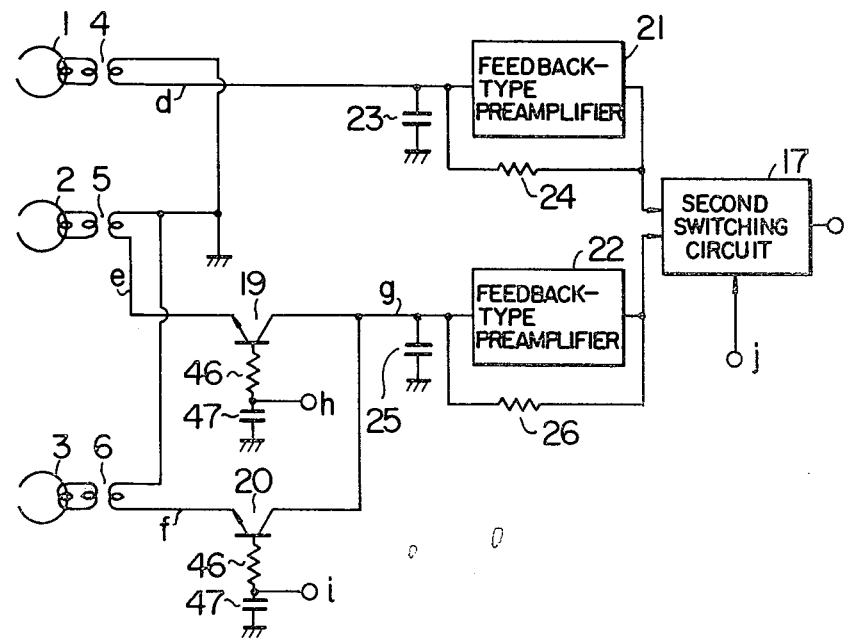

RECORD/REPRODUCE CIRCUIT FOR VTR

BACKGROUND OF THE INVENTION

This invention relates to a record/reproduce circuit for a VTR (video tape recorder) having special reproducing functions such as field still, fine slow motion and so on.

The helical scan type VTR has normally two magnetic heads of different azimuth angles which alternately scan first and second fields. Therefore, in the normal mode in which the magnetic tape travels at a normal speed for reproduction, a video picture can properly be reproduced from the tape. In a special reproduction mode such as the still reproduction mode or the fine slow motion reproduction mode in which the still reproduction and the play condition are repeated, the still reproduction is performed for each frame unit, and thus the same first and second fields of each frame are reproduced alternately. In this connection, since the first and second fields occur at intervals of 1/60 second, the first and second-field images of a high-speed motion picture are alternately reproduced, giving rise to a blur of image so that the still picture quality is quite poor. Moreover, in the still reproduction mode, although the magnetic heads scan two adjacent tracks on the magnetic tape from one to the other, since the adjacent tracks are formed by the magnetic heads with different azimuth angles, part of the tracks cannot be reproduced substantially even although the tracking volume control is turned. This gives rise to noise on the screen, reducing the noise drive margin.

Thus, recently, there has been developed a VTR having one or two additional heads provided so that two magnetic heads with the same azimuth angle can scan the same field track, as disclosed in the Japanese magazine, "Television technology", 1980, December, pages 45-50. According to this prior technique, in the still reproduction mode, the same field track is reproduced by two magnetic heads with the same azimuth angle, or field still reproduction is performed.

Thus, in the fine slow motion mode, since still and play reproductions are repeated alternately, it is necessary to switch the magnetic heads upon reproduction. In the above technique, in order that a switching noise is not caused by DC level difference at the head switching time point, preamplifiers the number of which is equal to that of heads used are provided to amplify the head outputs sufficiently and at the succeeding stage thereof the switching of heads is performed.

A conventional example of VTR will hereinafter be described with reference to FIG. 1. This example employs normal reproducing heads 1 and 2, and a special reproducing head 3. The heads 1 and 3 have the same azimuth angle, and the head 2 has a different azimuth angle from that of the heads 1 and 3. The heads 1, 2 and 3 are connected through rotary transformers 4, 5 and 6, resonating capacitors 7, 8 and 9 for adjusting the resonant frequencies, and damping resistors 10, 11 and 12 for adjusting the quality factors at the resonant points, to preamplifiers 13, 14 and 15, respectively. The resonating capacitors 7 to 9, and damping resistors 10 to 12 are provided to perform the peaking adjustment for the heads 1, 2 and 3, respectively. The reproduced outputs, b and c from the heads 2 and 3 are first applied to a first switching circuit 16 for switching the normal and special reproduction modes. The output of the switching circuit 16 and the output, a from the head 1 are applied to a second switching circuit 17, which selects the head having greater contact with the tape at each field. FIG. 2 shows the positions at which the heads 1, 2 and 3 are mounted on a rotary cylinder 18. The special reproducing head 3 is located at A, or B before or after the normal reproducing head 2. The distance between the magnetic gaps of the heads 2 and 3 on the circumference of the cylinder 18 is usually within 3H (1H is the distance corresponding to one horizontal scanning period on the circumference of the cylinder) so that horizontal skewing is not caused.

The drawbacks of the conventional example as shown in FIG. 1 include the requirement of: (1) the peaking adjustment for each of the three heads; and (2) three preamplifiers, which requirements increase cost of the VTR.

SUMMARY OF THE INVENTION

It is an object of this invention to provide an improved record/reproduce circuit for VTR having a special reproducing function and which is produced at low cost.

In order to achieve the above object, the circuit according to this invention is arranged so that the head change-over circuit is provided between the rotary transformers and the preamplifiers, the number of preamplifiers being the same as that of the normal reproducing heads, and the heads need no adjustment. Moreover, to prevent noise upon change-over of heads, the switching of the two related heads are performed at a time point during the reproducing period of the other head not related to the switching.

BRIEF DESCRIPTION OF THE DRAWINGS

FIG. 1 is a block diagram of an example of a conventional record/reproduce circuit.

FIG. 2 is a schematic plan view of a cylinder on which heads are mounted for normal and special reproduction.

FIG. 3 is a block diagram of a basic embodiment of this invention, showing only a reproducing mode.

DESCRIPTION OF THE PREFERRED EMBODIMENTS

Figure 4:
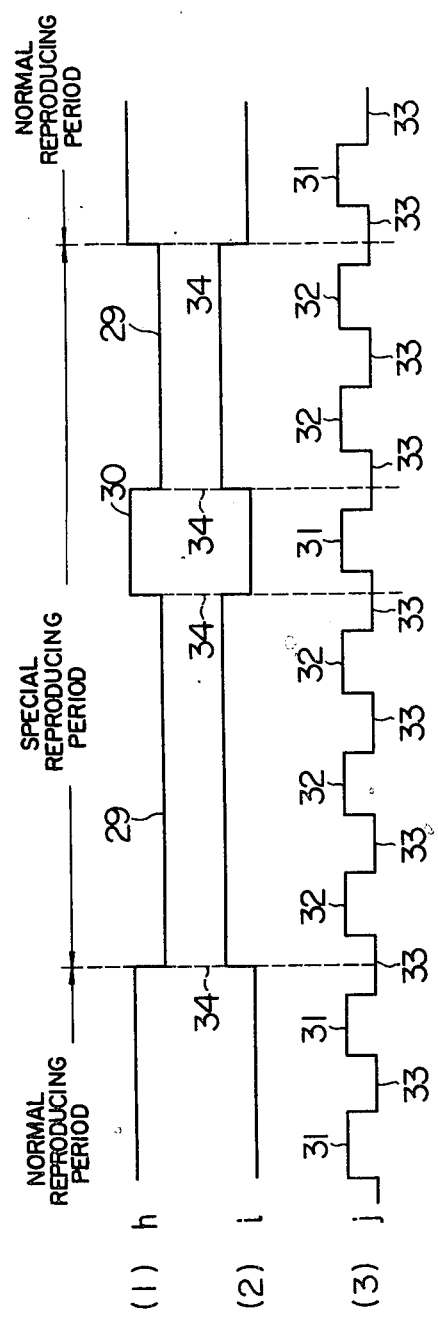
FIG. 4 is a timing chart of a control signal in the special reproduction mode.

FIG. 3 shows a circuit arrangement of a head change-over circuit in this invention. This head change-over circuit is different from the conventional one in that transistors 19 and 20 for switching a normal reproducing head 2 and a special reproducing head 3 are provided before a preamplifier and that feedback-type preamplifiers 21 and 22 which require no peaking adjustment are used therein. An output d of the head 1 is supplied to the input of the preamplifier 21 having a capacitor 23 and a feedback resistor 24 connected thereto, and the output of the preamplifier 21 is supplied to a second switching circuit 17. An output e of the head 2 and an output f of the head 3 are supplied to the transistors 19 and 20, the outputs, g of which are supplied to the input of preamplifier 22 having a capacitor 25 and a feedback resistor 26 connected thereto. The output of the preamplifier 22 is supplied to the second switching circuit 17. The feedback-type preamplifiers 21 and 22 serve to sufficiently damp the input to flatten its frequency characteristic by the feedback action even though the inductances of the heads are different and to provide a flat delay characteristic and amplitude characteristic without deterioration of its noise figure. These functions of these feedback preamplifiers have an important meaning in the invention. In other words there is no need for peaking adjustment (peaking frequency, peaking level, and so on) for each head unlike the prior art and the present invention enables the reproduced outputs from the heads 2 and 3 to be processed in a single preamplifier system consisting of the capacitor 25, feedback resistor 26 and preamplifier 22. As a result, the transistor switches 19 and 20 for normal and special playback modes can be provided in front of the preamplifier 22. This circuit arrangement thus requires only two preamplifiers, while the conventional one requires three preamplifiers. In this arrangement, resistors 46 serve to restrict the base currents of the transistor switches 19 and 20 and capacitors 47 serve to remove noise.

However, when the transistor switches 19 and 20 are connected just before the preamplifier 22, a problem is caused; that is when the reproducing heads 2 and 3 are switched during a time in which either one is in the signal reproducing mode, switching noise occurs due to DC level difference and so on. This noise appears as a large noise bar on the screen of a display, deteriorating the picture quality to a great extent. In order to prevent this, the switching of the heads 2 and 3 is performed when the head 1 is reproducing a signal. This operation will be described with reference to the waveform diagrams of FIGS. 4(1) to 4(3). The transistors 19 and 20 are turned on by high levels of control signals h and i, as shown in FIGS. 4(1) and 4(2), which are applied to the bases, respectively, and they are turned off by the low levels. Thus, in the normal reproducing period 30, the control signals h and i are at a high level and a low level, respectively. In a field still period 29 of the special reproducing period, the control signals h and i are at a low level and a high level, respectively, and in a fine slow motion period thereof, since the field still reproduction and the normal reproduction are alternately performed, the control signals h and i are at a high level and a low level, respectively only in the normal reproducing period 30. A control signal j, as shown in FIG. 4(3), to be applied to the second switching circuit 17 is a pulse of 30 Hz (for the NTSC system) formed from the rotating drum pulse, and repeats high and low levels at each field. It is assumed that when the signal j is at a low level, the head 1 reproduces a signal, and when it is at a high level, the head 2 or 3 reproduces a signal. When the signal j is at a high level, the reproducing periods 31 and 32 of the heads 2 and 3 are determined by the signals h and i, respectively. The reproducing period for head 1 is represented by numeral 33. Here, it is important in this invention to bring a switching point 34 between the heads 2 and 3 within the reproducing period 33.

Figure 5:
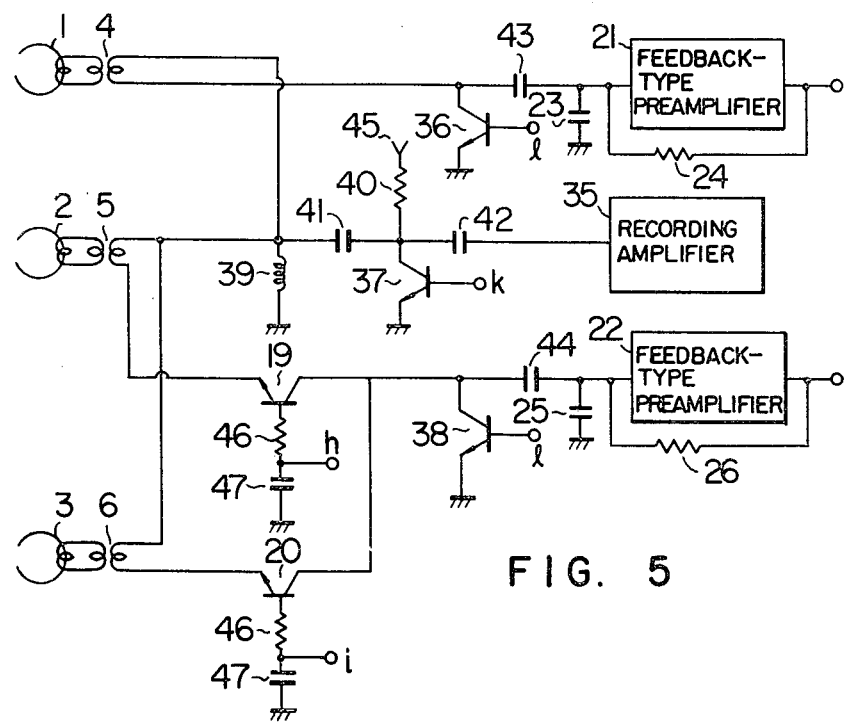
FIG. 5 is a block diagram of one embodiment of this invention for the recording and reproducing modes.

FIG. 5 shows another head switching circuit which is different from the circuit arrangement of FIG. 3 in that the circuit arrangement of FIG. 5 additionally has a recording amplifier 35, record/reproduce changeover transistors 36, 37 and 38, a choke coil 39, a resistor 40, and capacitors 41, 42 and 43. Upon reproduction, the transistor 37 is turned on by a high level of a base current k, and the transistors 36 and 38 are turned off by a low level of a base current l, so that operation in AC the arrangement of FIG. 5 is similar to that of FIG. 3. Upon recording, the transistor 37 is turned off by a low level of the current k, and the transistors 36 and 38 are turned on by a high level of the current l, so that a current from the recording amplifier 35 flows in the head. In this case, in order that the normal reproduce heads 1 and 2 are operated as recording heads, and that the special reproduce head 3 is not operated, it is always necessary upon recording that the transistor 19 is turned on by a high level of the signal h and the transistor 20 is turned off by a low level of the signal i.

In FIG. 5, the choke coil 39 permits a DC base current to be flowed to the bases of the transistors 19 and 20 which are thus turned on. The choke coil 39 is selected to offer a sufficiently high impedance (in practice, 10 times as large as that of the head inductance) in a working signal frequency band, thus preventing the recording current from partially flowing in the choke coil 39 upon recording. Although a resistance can be used instead of the choke coil 39, the resistance is limited to a relatively small value by the base currents of the transistors 19 and 20, and therefore the recording efficiency is reduced as compared with that of the choke coil. The resistance 40 serves to prevent the transistor 37 from being turned on by a large level of recording current upon recording (when the transistor 37 is nonconductive), and is connected to a DC power supply 45. The capacitors 41, 42, 43 and 44 serve to prevent DC coupling.

Figure 6:
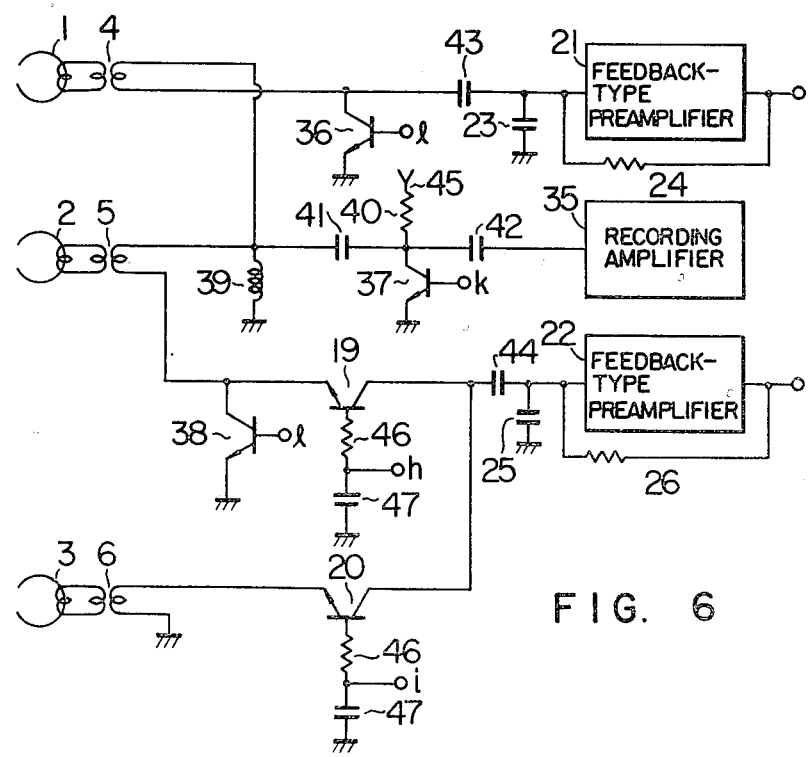
FIG. 6 is a block diagram of another embodiment of this invention.

FIG. 6 is still another modification which is different from the arrangement of FIG. 5 in that the record/reproduce switching transistor 38 is provided between the rotary transformer 5 and the transistor 19 and that one end of the rotary transformer 6 is grounded. In this case, one of the advantages is that the special reproduce head 3 is isolated from the recording system so that upon recording, a signal induced in the head 3 is prevented from interfering with the heads 1 and 2. The other advantage is that upon recording, since one end of the input terminals to the head 2 is grounded through the transistor 38 which is provided between the rotary transformer 5 and the switching transistor 19 and turned on, the recording circuit section is never affected by the reproducing circuit section even though the transistor 19 is turned off by a large current.

In this embodiment of this invention as described above, the bipolar-transistor switches 19, 20, 36, 37 and 38 can all be replaced by FET (field-effect transistor) switches. However, since the resistances of the switches 19 and 20 which are connected in series in the reproducing circuit when they are turned on generate noise, the values of the resistances must be small enough. The bipolar transistors have resistance of 2 to 3$\Omega$ when turned on by the base current of about 3 mA. In this case, it is particularly not necessary to flow DC collector current in the transistors 19 and 20 as seen in the circuits of FIGS. 5 and 6.

Moreover, even in the case of using a preamplifier which requires the peaking adjustment as in the prior art, adjustments such as variable capacitors may be provided between the head 2 and transistor switch 19 and between the head 3 and transistor 20, thereby the same effect as in the above embodiments of this invention being expected.

According to the invention, as described above, since the normal reproducing and special reproducing modes can be switched at a position in the path between the rotary transformer and preamplifier, the reproducing circuit can be produced at low cost.

What is claimed is:

1. A record/reproduce circuit for VTR comprising: at least first and second normal reproducing rotary heads with different azimuth angles;
   at least one special reproducing rotary head with the same azimuth angle as that of said first normal reproducing rotary head; coupling means for connecting said rotary heads to a non-rotary circuit portion; said non-rotary circuit portion including;
   a first preamplifier for amplifying a signal from said first normal reproducing rotary head,
   a second preamplifier for amplifying signals from said second normal reproducing rotary head and said special reproducing rotary head, and change-over means connected between said coupling means and said second preamplifier to selectively supply either of the signals from said second normal reproducing rotary head and said special reproducing rotary head to said second preamplifier.

2. A record/reproduce circuit according to claim 1, wherein said second preamplifier is a feedback-type preamplifier.

3. A record/reproduce circuit according to claim 2, wherein said first preamplifier is a feedback-type preamplifier.

4. A record/reproduce circuit according to claim 1, wherein said change-over means perform a switching operation during a reproducing period of said first normal reproducing rotary head.

5. A record/reproduce circuit according to claim 1, wherein said non-rotary circuit portion further comprises: a recording signal amplifier for supplying a recording signal to said first and second normal rotary heads;
   first switching means connected between said recording signal amplifier and said coupling means connected to said first and second normal reproducing rotary heads, to stop said recording signal from being supplied upon reproduction; second switching means connected between said first preamplifier and said coupling means connected to said first normal reproducing rotary head, to stop a reproduced signal from being supplied to said first preamplifier upon recording; and
   third switching means connected between second preamplifier and said coupling means connected to said second normal reproducing rotary head, to stop a reproduced signal from being supplied to said second preamplifier upon recording.

6. A record/reproduce circuit according to claim 5, wherein said third switching means is disposed between said second preamplifier and said change-over means.

7. A record/reproduce circuit according to claim 5, wherein said third switching means is disposed between said coupling means connected to said second normal reproducing rotary head and said change-over means.

8. A record/reproduce circuit according to claim 1, 2, 3, 4, 5, 6 or 7, wherein said change-over means comprises fourth switching means disposed between said second preamplifier and said coupling means connected to said second normal reproducing rotary head and fifth switching means disposed between said second preamplifier and said coupling means connected to said special reproducing rotary head, and said fourth and fifth switching means are alternately opened.

9. A record/reproduce circuit according to claim 5, 6 or 7, wherein said coupling means connected to said first and second normal reproducing rotary heads have one ends connected together, the junction therebetween being grounded through a choke coil, and the other ends connected to said first preamplifier and said change-over means, respectively.

10. A record/reproduce circuit according to claim 1, wherein said non-rotary circuit portion further comprises switching means connected to the output of said first preamplifier and the output of said second preamplifier for selectively supplying either of the signals from said first preamplifier and said second preamplifier as an output thereof.

11. A record/reproduce circuit for a VTR comprising a plurality of rotary heads including at least first and second normal reproducing rotary heads with different azimuth angles and at least one special reproducing rotary head with the same azimuth angle as that of said first normal reproducing rotary head, coupling means for connecting said rotary heads to a non-rotary circuit portion, said non-rotary portion, including a plurality of preamplifiers, the number of said preamplifiers being less than the number of said plurality of rotary heads, said plurality of preamplifiers including a first preamplifier for amplifying a signal from said first normal reproducing rotary head, and a second preamplifier for amplifying signals from said second normal reproducing rotary head and said special reproducing rotary head, and change-over means connected between said coupling means and said second preamplifier to selectively supply either of the signals from said second normal reproducing rotary head and said special reproducing rotary head to said second preamplifier.

* * * * *